United States Patent
Michelsen et al.

(10) Patent No.: US 11,356,709 B2
(45) Date of Patent: Jun. 7, 2022

(54) USING MOTION COMPENSATED TEMPORAL FILTER (MCTF) STATISTICS FOR SCENE CHANGE DETECTION WHEN A FADE, DISSOLVE OR CUT OCCURS

(71) Applicant: ARRIS Enterprises LLC, Suwanee, GA (US)

(72) Inventors: Wayne D. Michelsen, Santa Clara, CA (US); Swaroop Chanda, Santa Clara, CA (US); Wei Zhou, Milpitas, CA (US); Jane Perera, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 979 days.

(21) Appl. No.: 14/963,727

(22) Filed: Dec. 9, 2015

(65) Prior Publication Data

US 2016/0198195 A1    Jul. 7, 2016

Related U.S. Application Data

(60) Provisional application No. 62/099,674, filed on Jan. 5, 2015.

(51) Int. Cl.
*H04N 9/00*   (2006.01)
*H04N 19/87*  (2014.01)
(Continued)

(52) U.S. Cl.
CPC ........ *H04N 19/87* (2014.11); *H04N 19/107* (2014.11); *H04N 19/142* (2014.11);
(Continued)

(58) Field of Classification Search
CPC .. H04N 19/146; H04N 19/194; H04N 19/172; H04N 19/51; H04N 19/142; H04N 19/87; H04N 19/615; H04N 19/107
(Continued)

(56) References Cited

U.S. PATENT DOCUMENTS 5,805,733 A      9/1998  Wang et al.
9,813,706 B1 *  11/2017  Lin ....................... H04N 19/51
(Continued)

FOREIGN PATENT DOCUMENTS

| EP | 2224745 A1 | 9/2010 |
|---|---|---|
| EP | 2293539 A2 | 3/2011 |
| WO | 2007/047758 A1 | 4/2007 |

OTHER PUBLICATIONS

PCT Search Report & Written Opinion, Re: Application No. PCT/US2015/064714; dated Mar. 4, 2016.
(Continued)

*Primary Examiner* — Zhihan Zhou
(74) *Attorney, Agent, or Firm* — Chernoff, Vilhauer, McClung & Stenzel, LLP (57) ABSTRACT

A method is provided to better detect a scene change to provide a prediction to an encoder to enable more efficient encoding. The method uses a Motion Compensated Temporal Filter (MCTF) that provides motion estimation and is located prior to an encoder. The MCTF provides a Motion Compensated Residual (MCR) used to detect the scene change transition. When a scene is relatively stable, the MCR score is also relatively stable. However, when a scene transition is in process, the MCR score behavior changes, Algorithmically, the MCR score is used by comparing the sliding mean of the MCR score to the sliding median. This comparison highlights the transition points. In the case of a scene cut, the MCR score exhibits a distinct spike. In the case of a fade or dissolve, the MCR score exhibits a transitional period of degradation followed by recovery. By implementing the above detection using the MCR, the location of the I-pictures in the downstream encoding process can be accurately determined for the encoder.

11 Claims, 7 Drawing Sheets

(51) Int. Cl.
*H04N 19/194* (2014.01)
*H04N 19/615* (2014.01)
*H04N 19/172* (2014.01)
*H04N 19/107* (2014.01)
*H04N 19/142* (2014.01)
*H04N 19/146* (2014.01)
*H04N 19/51* (2014.01)

(52) U.S. Cl.
CPC ......... *H04N 19/146* (2014.11); *H04N 19/172* (2014.11); *H04N 19/194* (2014.11); *H04N 19/51* (2014.11); *H04N 19/615* (2014.11)

(58) Field of Classification Search
USPC .................................................. 375/240.12
See application file for complete search history.

(56) References Cited

U.S. PATENT DOCUMENTS

| | | | | |
|---|---|---|---|---|
| 2005/0152450 | A1* | 7/2005 | Ueno | H04N 19/87 375/240.03 |
| 2007/0160128 | A1* | 7/2007 | Tian | H04N 5/147 375/240 |
| 2009/0086816 | A1* | 4/2009 | Leontaris | H04N 19/15 375/240.03 |
| 2011/0090960 | A1* | 4/2011 | Leontaris | H04N 19/103 375/240.12 |
| 2012/0275514 | A1* | 11/2012 | Leontaris | H04N 19/105 375/240.02 |
| 2014/0247888 | A1* | 9/2014 | Tourapis | H04N 19/0089 375/240.26 |

OTHER PUBLICATIONS

Combined Search and Examination Report, RE: Great Britain Application No. GB1522139.3, dated Jan. 29, 2016.
Examination Report, RE: Great Britain Application No. GB1522139.3, dated Feb. 22, 2017.

* cited by examiner

FIG. 1

Frame 212: Cross Fade Start Scene

FIG. 2

Frame 228: Cross Fade Mid-Scene

FIG. 3

Frame 240: Cross Fade Termination Scene 1

FIG. 4

Frame 240: Cross Termination Scene 2

USING MOTION COMPENSATED TEMPORAL FILTER (MCTF) STATISTICS FOR SCENE CHANGE DETECTION WHEN A FADE, DISSOLVE OR CUT OCCURS

CROSS REFERENCE TO RELATED APPLICATION

This Application claims priority under 35 U.S.C. § 119(e) from earlier filed U.S. Provisional Application Ser. No. 62/099,672 filed on Jan. 5, 2015 and incorporated herein by reference in its entirety.

BACKGROUND

Technical Field

The present invention relates to detection of a scene change such as when a fade, dissolve or scene cut occurs. More particularly, the invention relates to detection of a scene change and providing the scene change termination points as an indicator to an encoder to enable more efficient video encoding.

Related Art

Scene transitions such as cuts, fades and dissolves adversely affect encoding efficiency because of increased temporal entropy. In other words, as video frames are processed in an encoder, there is a lack or order of predictability when scene changes occur that do not enable the encoder to efficiently allocate bits for encoding to particular frames. Accurate detection of scene transitions is, thus, desirable for encoding. Along with allocation of bits for encoding, detection of a scene change accurately has at least the three following potential uses:

(1) Enabling specifying a fresh reference picture (I-picture) to be provided as a first clean picture after the scene change transition is complete.

(2) Enabling a fade termination point to be determined for computed weighted predictions; and (3) Enabling beginning and ending termination points of a dissolve to be determined in weighted bi-prediction.

Detection of scene transition points is usually accomplished by examining reduced picture luma statistics, such as picture-average and block-histograms. However, this method is fragile since entirely different scenes can still have very similar luma variations. It is, thus, desirable to provide improved methods of detecting scene transitions.

SUMMARY

Embodiments of the present invention provide a method to better detect a scene change to provide a prediction to an encoder to enable more efficient encoding. The method uses a Motion Compensated Temporal Filter (MCTF) that provides a block of picture pre-processing prior to an encoder where the MCTF performs motion-estimation, and produces a motion-compensation prediction on temporally sequential pictures. The MCTF block provides a measure of the Motion Compensated Residual (MCR) that is used in embodiments of the present invention to detect the scene change. The MCR measure is not subject to the limitation of scene luma similarity, and provides a more accurate scene change detection method.

When a scene is relatively stable, the MCR score is also relatively stable. Both the mean MCR score, and the MCR variance, varies slowly within a scene. However, when a scene transition is in process, MCR score behavior changes because whatever temporal predictability there was within the scene is compromised. Algorithmically, the MCR score is used to predict scene change points by comparing the sliding mean of the MCR score to the sliding median. This comparison highlights the scene transition terminals. In the case of a scene cut, the MCR score exhibits a distinct spike. In the case of a fade or dissolve, the MCR score exhibits a transitional period of degradation followed by recovery.

By implementing the above detection using the MCR, the location of the I-pictures in the downstream encoding process can be accurately determined for the encoder. Further bits can be better allocated during the encoding process with the scene change terminal points more accurately predicted.

BRIEF DESCRIPTION OF THE DRAWINGS

Further details of the present invention are explained with the help of the attached drawings in which.

DETAILED DESCRIPTION

For embodiments of the present invention, if a scene clip can be identified as a scene change, good video quality can be achieved in particular by more accurately determining the location for I-pictures. In H262, H264, and H265 (also known as MPEG2, AVC and HEVC respectively) video encoding, Intra-coded pictures (I-pictures) are decodable in isolation, and are not dependent upon information from other pictures. They are used to terminate error propagation, and to provide a clean reference for future Inter-predicted pictures (P and B-pictures). As such, it is important to place I-pictures, within the encoded video stream, at locations that provide a tactical advantage for efficient encoding. When considering scene changes, the optimum place for an I-picture is at the immediate beginning of a new scene; that being the first picture after the completion of a fade-in, cross-fade, or scene-cut.

To help understand how a determination of when a frame is a scene change according to the present invention, several different scene clips of data along with per frame bit allocation and MCR score are analyzed.

Figure 1:
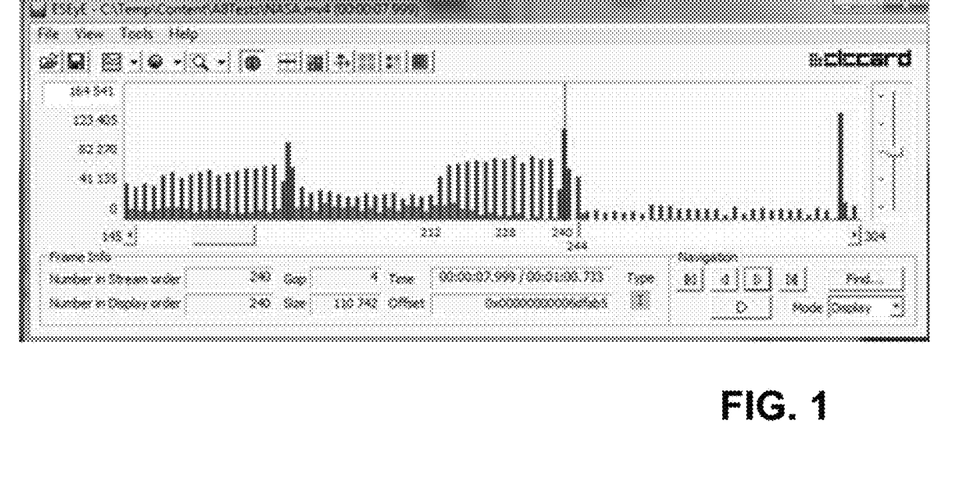
FIG. 1 shows a graph of frames vs. bit allocation for a video clip with a cross-fade scene change.

FIG. 1 plots frames of a video clip with frames numbered along the along an X-axis with allocated bits shown on the Y-axis. The video clip values plotted in FIG. 1 shows a typical ½ second cross-fade, in an MPEG-2 encoded file. Specific frames 212, 228, 240 and 244 form the beginning, middle and termination of the cross-fade scene change that are shown in subsequent figures. The red lines indicate where prior art scene change points are identified by previous scene change detection methods.

Figure 2:
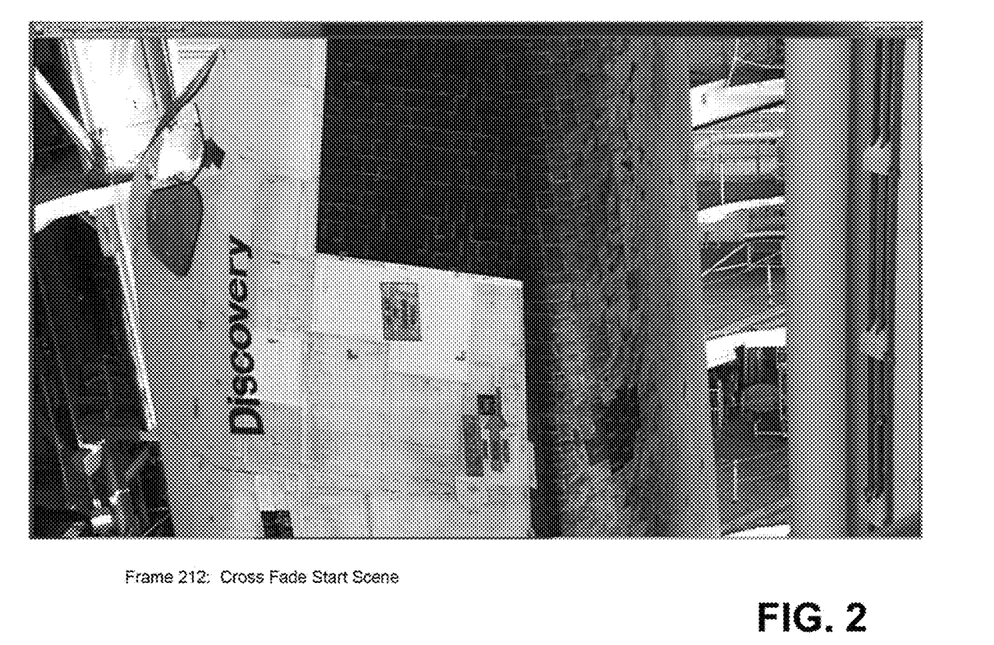
FIG. 2 shows frame 212 from FIG. 1, where the cross-fade starts.
Figure 3:
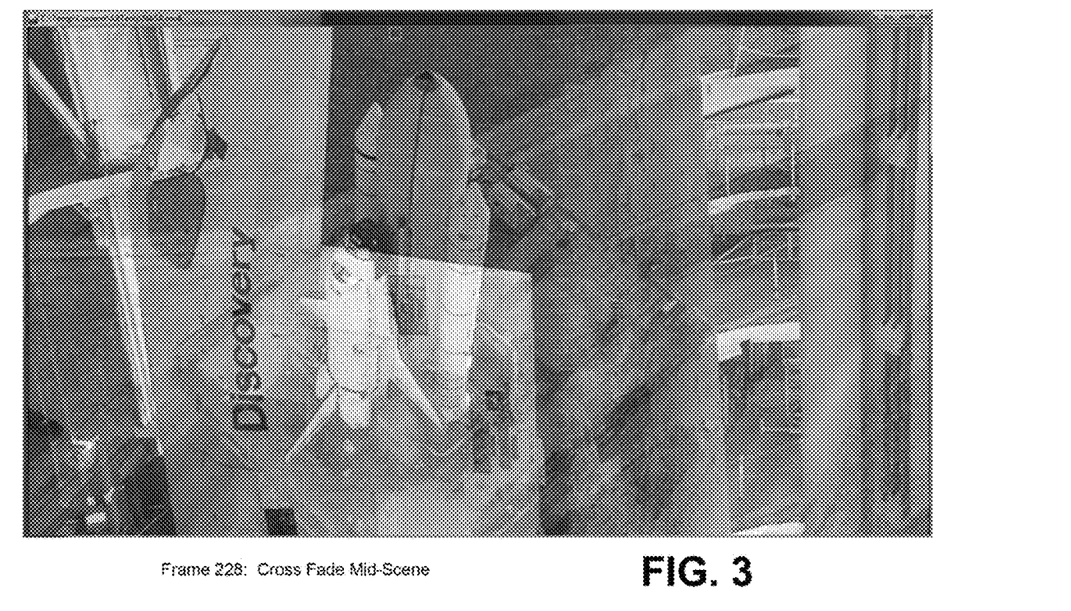
FIG. 3 shows frame 220 from FIG. 1, where the cross-fade mid-point occurs.
Figure 4:
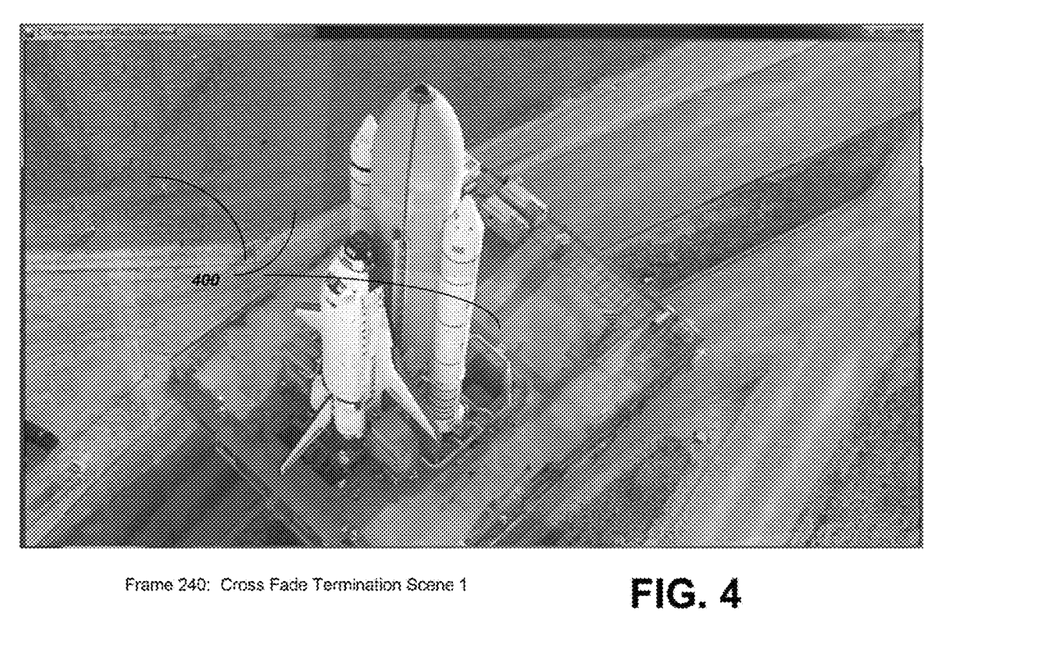
FIG. 4 shows frame 240 from FIG. 1, where the cross-fade termination was detected using prior art methods.
Figure 5:
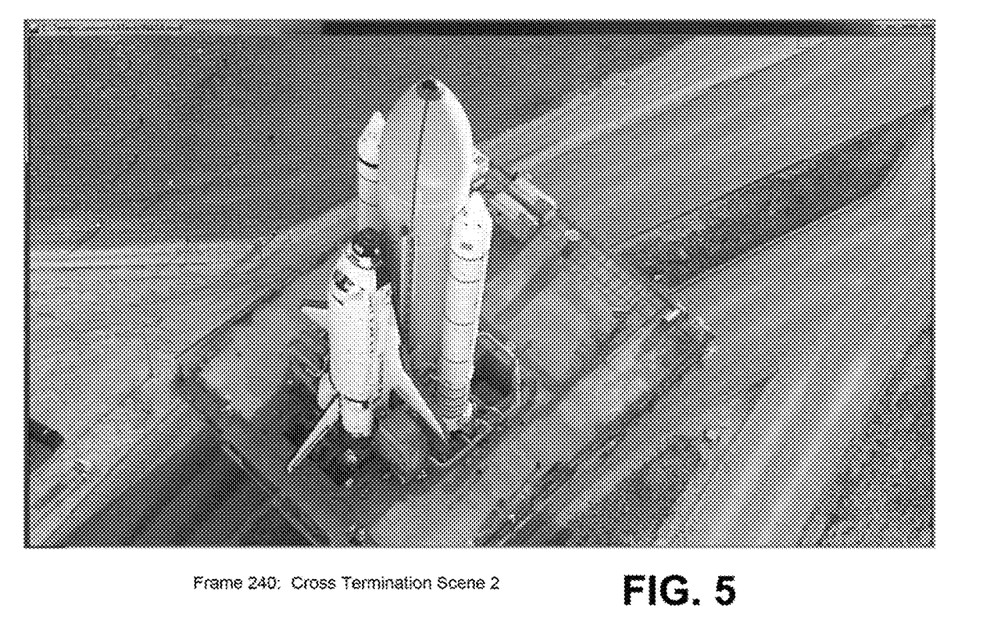
FIG. 5 shows frame 244 from FIG. 1, where the cross-fade termination actually occurs.

FIGS. 2-5 show the start through termination frames for the cross-fade graphed in FIG. 1. FIG. 2 shows frame 212 of the video clip graphically illustrated in FIG. 1 where the cross fade scene change begins. In FIG. 2, the initial scene is a close-up of the nose of the space shuttle, and the new scene being added with cross-fade is a scene with the complete space shuttle and launch pad. FIG. 3 shows frame 228 of the video clip where the cross fade mid-point alpha blended frame occurs. FIG. 4 shows frame 240 of the video clip where the cross fade termination was detected using previous detection methods. In the encoded original content, the end of the fade was not handled optimally. Frame 240 was encoded as an anchor I-frame, but as can be seen in FIG. 4 in area 400 the original space shuttle nose cone scene can still be seen as the cross-fade is still in progress. Finally, FIG. 5 shows frame 244 of the video clip where the cross fade termination actually occurs, the point that termination is detected using embodiments of the present invention.

Figure 6:
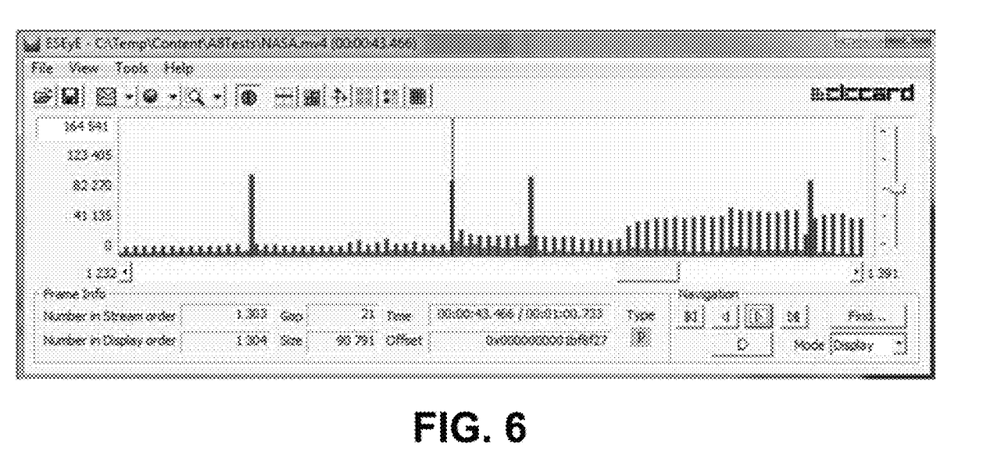
FIG. 6 shows a graph of frames vs. bit allocation for a video clip where a scene cut occurs at frame 1304.
Figure 7:
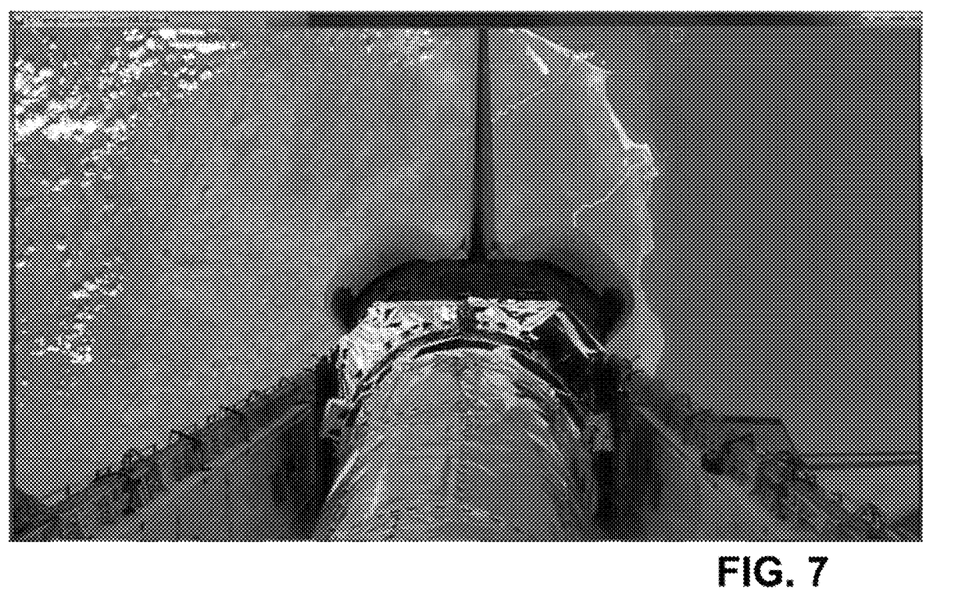
FIG. 7 shows the scene cut start that is graphically illustrated in FIG. 6.
Figure 8:
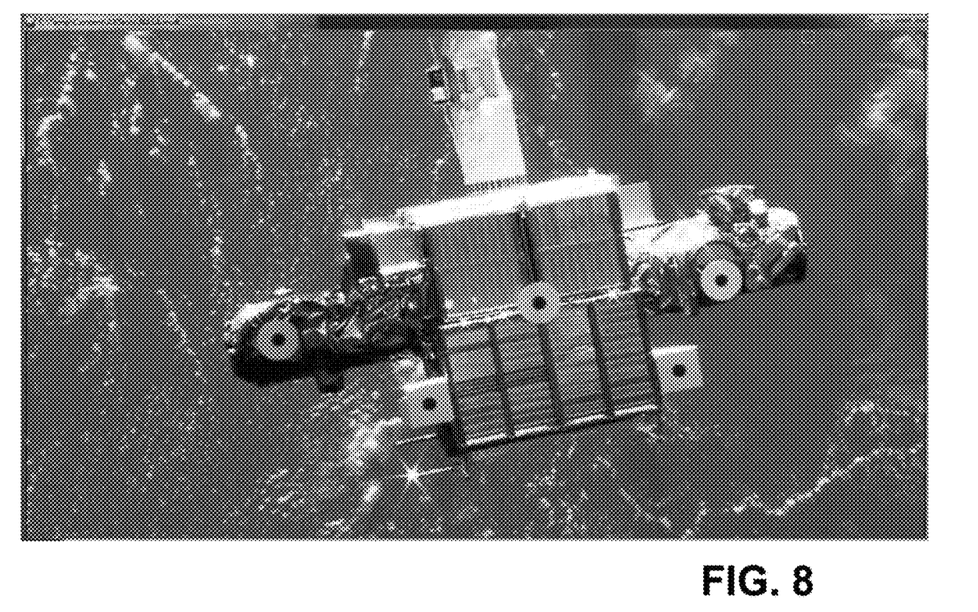
FIG. 8 shows the scene cut end that is graphically illustrated in FIG. 6.

FIG. 6 shows frames of a video clip with a scene cut that occurs at frame 1304, near the middle of the graph. In FIG. 6 the frames are numbered along the X-axis and allocated bits are shown on the Y-axis. FIGS. 7-8 show the specific scenes before and after scenes for the scene cut of FIG. 6. FIG. 7 shows the scene cut start with the storage bay of the space shuttle. Finally, FIG. 8 shows the scene cut end scene which is the solar panels of the space station.

Figure 9:
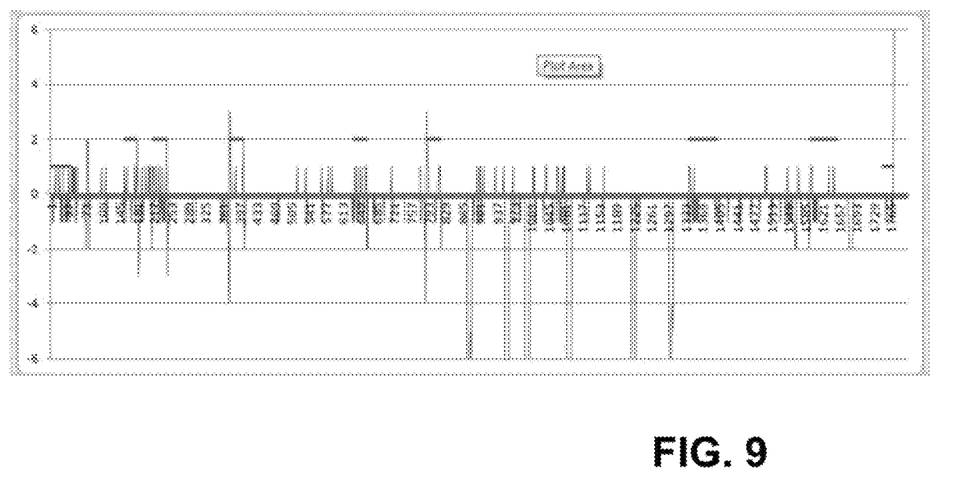
FIG. 9 shows the MCR measurement values plotted for the two cases shown in FIGS. 1-5 and FIGS. 6-8, respectively.

FIG. 9 shows MCTF motion compensated residual (MCR) measurement values plotted on the Y-axis respectively versus the frame numbers plotted on the X-axis for the two cases shown in FIGS. 1-5 and FIGS. 6-8, respectively. In the two cases shown in FIGS. 1-5 and FIGS. 6-8, the reduced MCR in FIG. 9 shows the upcoming scene transition location prior to encoding. For the cross-fade of FIGS. 1-5, the MCR score exhibits a transitional period of degradation followed by recovery which terminates at the termination of frame 244. For the scene cut in FIGS. 6-8, when the scene cut frame 1304 is encountered, the MCR score exhibits a distinct spike.

Figure 10:
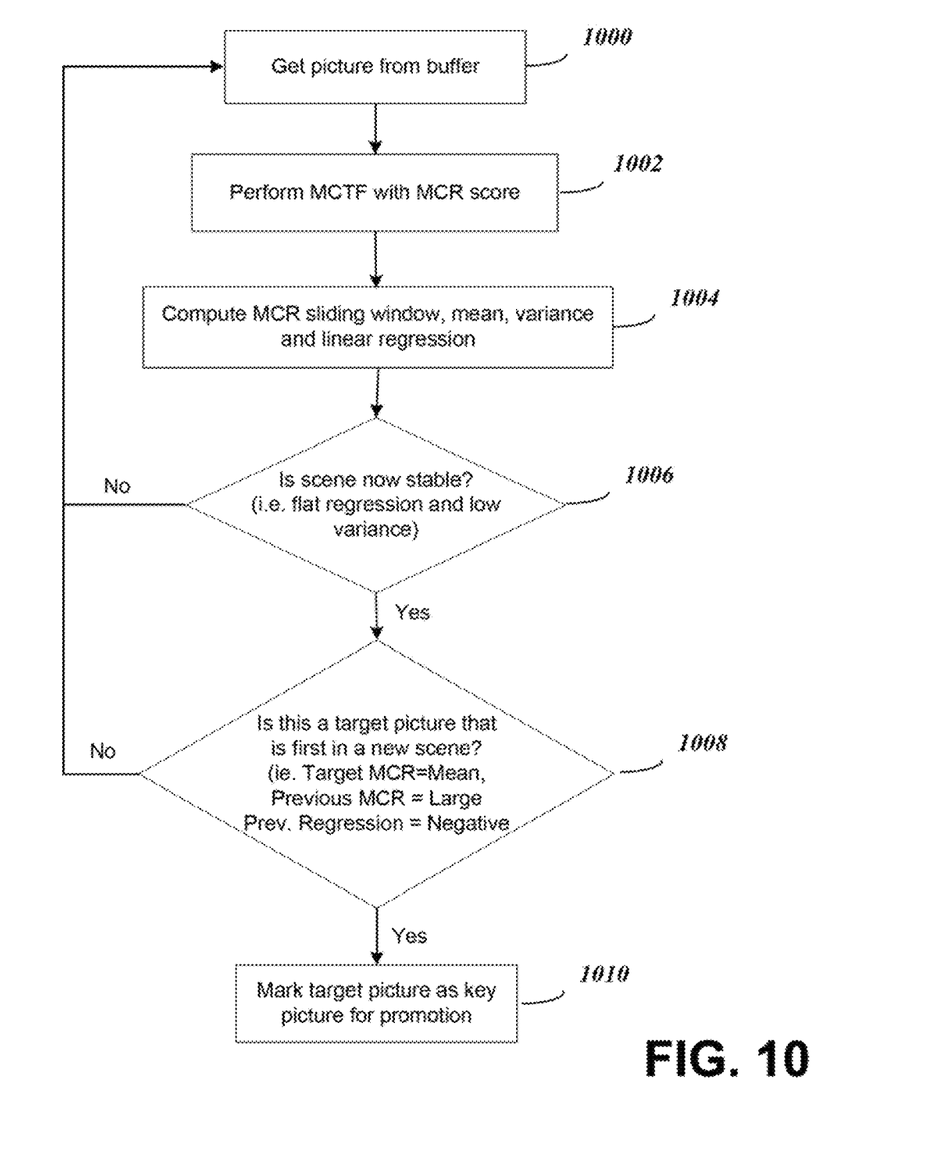
FIG. 10 is a flow chart showing steps for identification of a frame for a scene change according to embodiments of the present invention.

FIG. 10 is a flow chart showing steps for identification of a frame for a scene change according to embodiments of the present invention. In step 1000 pictures are first taken from a frame buffer that feeds an encoder, one frame at a time for evaluation. Next, in step 1002 the frame is put through the MCTF with a MCR score determined. Next, in step 1004 for the MCR score, a sliding window, mean, variance and linear regression is determined for a group of frames previously received in the frame buffer preceding the encoder, including the present frame being evaluated, to enable later evaluation of the present frame to be performed.

The next steps of FIG. 10 use the MCR score to evaluate the present frame. In step 1006 a determination if the present scene is stable is made. The scene stability is determined based on whether the MCR linear regression is flat and the MCR variance is low. If not, operation returns to step 1000 and a next frame is taken from the buffer. If so, the present frame may be the target frame for a scene change and operation proceeds to step 1008. In step 1008, a further evaluation of the present scene is made to determine if the present frame is the target frame that ends the scene change. The evaluation is performed by looking at the target MCR relative to the mean of previous frames, whether the previous frame MCR was significantly larger and whether the regression from the previous frame was negative. If in step 1008 the evaluation does not determine this is the target frame, control returns to step 1000 where the next frame is obtained from the buffer. If in step 1008 the frame is determined to be the target frame that terminates the scene change, control proceeds to step 1010 where the frame is marked as a key picture for promotion as the target frame to the encoder.

Figure 11:
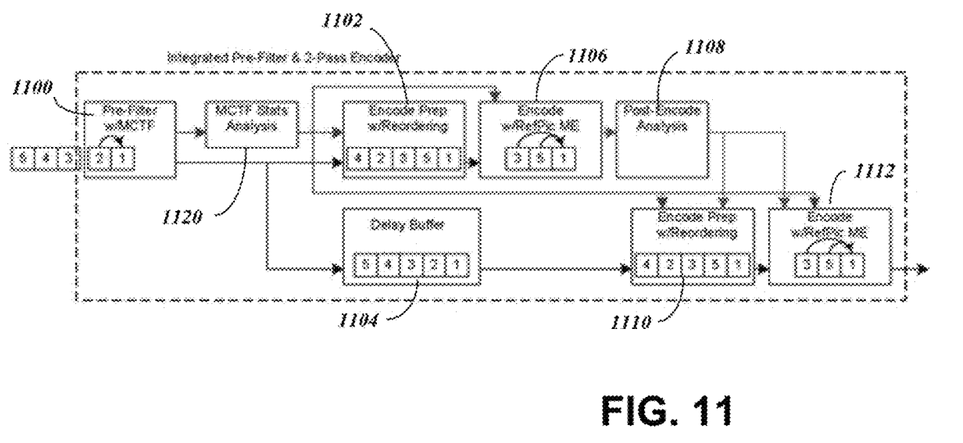
FIG. 11 illustrates components needed for encoding to implement embodiments of the present invention.

FIG. 11 illustrates components needed to implement embodiments of the present invention. The system shown in FIG. 11 is an integrated pre-filter and two pass encoder. Frames of a video for encoding are provided to buffer registers of a pre-filter 1100 that provides MCTF evaluation of the video frames. A new MCTF statistics evaluation element 1120, that provides MCR values and analysis, receives the output from the pre-filter 1100. The MCTF statistics evaluation element 1120 provides information such as setting of the MCR sliding window for evaluation of frames, the MCR mean of a group of frames, and the variance and linear regression of the MCR. The MCTF statistics evaluation element 1120 further provides information such as determination of a target MCR mean value variance that a termination frame may have, as well as providing a comparison of the present frame being evaluated with the values determined from frames in the sliding evaluation window. The statistics output from the MCTF statistics evaluation element 1120 are then provided to subsequent components for encoding.

The encoding system of FIG. 11 further includes elements that provide two-pass encoding with a first path including the elements: Encode preparation with reordering element 1102, Encode with reference picture and Motion Estimation (ME) element 1106 and Post encode analysis element 1108. The first path provides statistical data to enable more efficient encoding in the second path. The MCTF statistics evaluation element 1120 output is provided to elements 1102 and 1106 in the first path. Also, the video data output from the pre-filter 1100 is provided through the first path elements 1102, 1106 and 1108.

The second path in FIG. 11 includes the elements: Delay buffer 1104, Encode preparation with Reordering element 1110 and Encode with reference picture and ME element 1112. The output of the statistics evaluation element 1120 is provided to the elements 1110 and 1112. The video data output from the pre-filter 1100 is also provided through the second path elements 1104, 1110 and 1112. The statistical data from the first path is further provided to elements 1110 and 1112 of the second path to enable more efficient encoding.

The system shown in FIG. 11 has the Pre-Filter with MCTF element 1100 integrated with the remainder of the encoder components. The MCTF based MCR data may not otherwise be available to the encoding process, because the pre-filter is either in an isolated hardware component, or because the low-level MCR results are not exposed outside the native MCTF hardware. The MCR scores are also more smoothly behaved than a similar process that could be operated using a single pass encoding process.

For components shown in FIG. 11, the elements can be controlled by one or more processors linked to one or more memories to enable operation. The memory stores code that is executable by a processor to enable the processor to perform the processes described herein. Further the memory can be used to provide data storage with the data accessible by the processor to store or retrieve when performing operations.

Although the present invention has been described above with particularity, this was merely to teach one of ordinary skill in the art how to make and use the invention. Many additional modifications will fall within the scope of the invention as that scope is defined by the following claims.

What is claimed:

1. A method for encoding video using scene change detection, the method for determining an initial frame of a new scene following a gradual scene transition and comprising:
    obtaining video frames provided to an encoder;
    determining a sliding MCR score for individual ones of the video frames, the MCR score based on a motion compensated residual (MCR) for the video frames;
    determining a first set of statistics using respective MCR scores for a plurality of the video frames leading up to a current frame;
    determining a second set of statistics using respective MCR scores for a plurality of the video frames leading up to the current frame, the second set of statistics different than the first set of statistics;
    classifying the current frame as the initial frame of the new scene following a gradual scene transition based on a comparison of each of the first set of statistics to respective thresholds and based on a comparison of each of the second set of statistics to respective thresholds; wherein the first set of statistics comprises a linear regression of the MCR and a variance of the MCR, and the comparison of the first set of statistics to respective thresholds determines whether the MCR linear regression is flat and the MCR variance is low.

2. The method of claim 1, wherein the first set of statistics are used to determine scene stability and the second set of statistics are used to verify that the current frame is a first frame following a gradual scene transition.

3. The method of claim 1, wherein the second set of statistics comprises an MCR score of a current frame relative to the mean MCR score of previous frames, a comparison of the MCR score of the current frame to that of the frame prior to the current frame, and a regression value of the MCR score of the frame prior to the current frame.

4. The method of claim 3, wherein the first set of statistics comprises a linear regression of the MCR and a variance of the MCR.

5. The method of claim 1 further comprising placing an I-frame during the encoding process at a point where the scene change occurs.

6. An apparatus to encode video frames, the apparatus comprising:
    an encoder having a first input for receiving video frames to be processed and a second input for receiving parameter data to enable the encoder to allocate bits for frames for encoding;
    a pre-filter with Motion Compensated Temporal Filtering (MCTF) frame buffer having an input receiving the video frames and an output providing the first input to the encoder;
    a MCTF statistical analysis module processor that provides a Motion Compensated Residual (MCR) for receiving the video frames from the pre-filter with MCTF and having an output providing the second input to the encoder;
    a preprocessor memory connected to the MCTF statistical analysis processor for storing code that is executable by the preprocessor to determine the parameter data to enable the encoder to allocate bits, the code causing the preprocessor to perform the following steps:
    obtaining a MCR for the video frames;
    determining a sliding MCR score for individual ones of the video frames, the MCR score based on the MCR for the video frames;
    determining a first set of statistics using respective MCR scores for a plurality of the video frames leading up to a current frame that follows a scene transition;
    determining a second set of statistics using respective MCR scores for a plurality of the video frames leading up to the current frame, the second set of statistics different than the first set of statistics; and
    classifying the current frame as the initial frame of a new scene following a gradual scene transition based on a comparison of each of the first set of statistics to respective thresholds and based on a comparison of each of the second set of statistics to respective thresholds; wherein the first set of statistics comprises a linear regression of the MCR and a variance of the MCR, and the comparison of the first set of statistics to respective thresholds determines whether the MCR linear regression is flat and the MCR variance is low.

7. The apparatus of claim 6, wherein the first set of statistics are used to determine scene stability and the second set of statistics are used to verify that the current frame is a first frame following a gradual scene transition.

8. The apparatus of claim 6, wherein the second set of statistics comprises an MCR score of a current frame relative to the mean MCR score of previous frames, a comparison of the MCR score of the current frame to that of the frame prior to the current frame, and a regression value of the MCR score of the frame prior to the current frame.

9. The apparatus of claim 8, wherein the first set of statistics comprises a linear regression of the MCR and a variance of the MCR.

10. The apparatus of claim 6 further comprising placing an I-frame during the encoding process at a point where the scene change occurs.

11. The apparatus of claim 6, wherein the encoder is a two path device with the MCTF statistical analysis module processor provided in a first path and the encoder provided in the second path.

* * * * *